United States Patent [19]

Miyazawa et al.

[11] Patent Number: 4,913,838

[45] Date of Patent: Apr. 3, 1990

[54] LIQUID CRYSTAL COMPOUND WITH A 4-(OPTICALLY ACTIVE ALKYL)-3-CYANOPHENYL GROUP

[75] Inventors: Kazutoshi Miyazawa; Takashi Inukai; Hiromichi Inoue; Shinichi Saito; Kouji Ohno, all of Kanagawa, Japan

[73] Assignee: Chisso Corporation, Ohsaka, Japan

[21] Appl. No.: 168,319

[22] Filed: Mar. 18, 1988

[30] Foreign Application Priority Data

Mar. 20, 1987 [JP] Japan .................. 62-67097

[51] Int. Cl.[4] .............. C09K 14/12; C09K 14/20; C09K 19/30; C09K 19/24; C07C 121/75; C07D 239/36; C07D 239/38; C07D 239/30

[52] U.S. Cl. .................. 252/299.61; 252/299.01; 252/299.63; 252/299.65; 252/299.66; 252/299.67; 350/350 R; 350/350 S; 544/238; 544/239; 544/240; 544/224; 544/296; 544/316; 544/318; 544/333; 544/334; 544/335; 546/257; 546/287; 546/296; 546/300; 546/330; 558/420; 558/423

[58] Field of Search ............ 252/299.01, 299.61, 252/299.63, 299.65, 299.66, 299.67; 350/350 R, 350 S; 546/257, 287, 296, 300, 330; 544/238, 239, 240, 224, 296, 316, 318, 333, 334, 335; 558/420, 423

[56] References Cited

U.S. PATENT DOCUMENTS

| | | | |
|---|---|---|---|
| 4,235,736 | 11/1980 | Beguin et al. | 252/299.65 |
| 4,341,653 | 7/1982 | Inukai et al. | 252/299.63 |
| 4,478,740 | 10/1984 | Eidenschink et al. | 252/299.66 |
| 4,622,165 | 11/1986 | Kano et al. | 252/299.01 |
| 4,728,458 | 3/1988 | Higuchi et al. | 252/299.01 |
| 4,737,313 | 4/1988 | Saito et al. | 252/299.63 |
| 4,765,924 | 8/1988 | Inoue et al. | 252/299.61 |
| 4,769,176 | 9/1988 | Bradshaw et al. | 252/299.65 |
| 4,776,973 | 10/1988 | Dofinger et al. | 252/299.61 |
| 4,780,242 | 10/1988 | Miyazawa et al. | 252/299.65 |
| 4,818,432 | 4/1989 | Miyazawa et al. | 252/299.66 |
| 4,820,839 | 4/1989 | Krause et al. | 252/299.61 |
| 4,828,754 | 5/1989 | Takehara et al. | 252/299.65 |

FOREIGN PATENT DOCUMENTS

| | | | |
|---|---|---|---|
| 84194 | 7/1983 | European Pat. Off. | 252/299.61 |
| 3515373 | 11/1986 | Fed. Rep. of Germany | 252/299.61 |
| 3600052 | 7/1987 | Fed. Rep. of Germany | 252/299.61 |
| 61-246168 | 11/1986 | Japan | 252/299.61 |
| 62-22889 | 1/1987 | Japan | 252/299.61 |
| 63-48254 | 2/1988 | Japan | 252/299.61 |
| 8600067 | 1/1986 | PCT Int'l Appl. | 252/299.61 |
| 8607055 | 12/1986 | PCT Int'l Appl. | 252/299.61 |
| 8705013 | 8/1987 | PCT Int'l Appl. | 252/299.65 |

OTHER PUBLICATIONS

Furukawa, K. et al., Ferroelectries, vol. 85, pp. 451-459 (1988).
Coates, D., Liquid Crystals, vol. 2, No. 4, pp. 423-428 (1987).
Dubois, J. C. et al., Mol. Cryst. Liq. Cayst., vol. 42, No. 1-3, pp. 139-152 (1977).

Primary Examiner—Teddy S. Gron
Attorney, Agent, or Firm—Wenderoth, Lind & Ponack

[57] ABSTRACT

An optically active liquid crystal compound having specific features suitable to a display mode utilizing ferroelectric chiral smectic phases and particularly having a large spontaneous polarization value, and a chiral liquid crystal composition containing the compound are provided, which compound is expressed by the formula

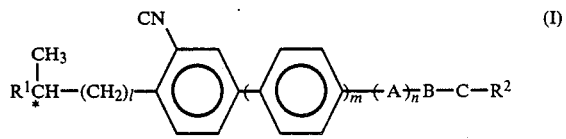

wherein $R^1$ represents an alkyl group of 2 to 18 carbon atoms; $R^2$ represents an alkyl group or alkoxy group each of 1 to 20 carbon atoms, hydrogen atom, a halogen atom or cyano group; A represents —COO— or —OCO—; B and C each represent a single bond,

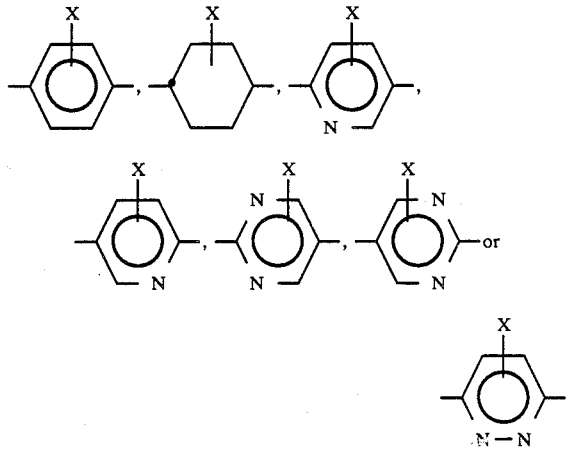

wherein X represents hydrogen atom, a halogen atom or cyano group; and l, m and n each represent 0 or 1.

13 Claims, No Drawings

LIQUID CRYSTAL COMPOUND WITH A 4-(OPTICALLY ACTIVE ALKYL)-3-CYANOPHENYL GROUP

BACKGROUND OF THE INVENTION

1. Field of the Invention

This invention relates to a novel liquid crystalline compound and a liquid crystal composition containing the same. More particularly it relates to a liquid crystalline compound having an optically active group and a chiral liquid crystal composition containing the same.

2. Description of the Related Art

At present, TN (Twisted Nematic) display mode has been most broadly employed, but it is inferior in the aspect of the response rate to emissive type display elements such as electroluminescence, plasma display, etc.; hence various improvements in this aspect have been attempted, but a possibility of its improvement to a large extent does not seem to remain so much. Thus, various devices based on another principle in place of that of TN mode display elements have been attempted, and among these there is a display mode utilizing ferroelectric liquid crystals (N. A. Clark et al; Applied Phys. lett., 36, 899 (1980)). This mode utilizes ferroelectric liquid crystal chiral smectic C phase (hereinafter abbreviated to SC* phase) or other smectic phases such as SH* phase, SF* phase, SG* phase, etc., and has the following three superior specific features as compared with TN display mode:

a first specific feature consists in that the mode affords a very high response rate, which amounts to 100 times those of TN mode display elements;

a second specific feature consists in that the mode affords a memory effect so that multiplex drive becomes easy in addition to the above-mentioned high rate response properties; and a third specific feature consists in that it is possible to more easily obtain the gray scale than with a TN display mode only by adjusting an inverting time of polarity so that the mode has been considered to be suitable for graphic display.

However, in spite of the fact that the mode has the above-mentioned superior specific features, currently known ferroelectric liquid crystals and compositions have not yet afforded fully satisfactory results in the aspect of the response rate; hence the mode appears to have somewhat come to a deadlock prior to their practical use. One reason for this can be said to consist in that development of a compound having a large spontaneous polarization value Ps has been late.

SUMMARY OF THE INVENTION

The object of the present invention is to provide a liquid crystal compound having specific features suitable to the above display mode, particularly having a large spontaneous polarization value.

The present inventors have conducted extensive research in order to develop an optically active liquid crystal compound suitable to be used for the above display mode, and as a result have achieved the present invention.

The present invention resides in an optically active liquid crystalline compound expressed by the formula

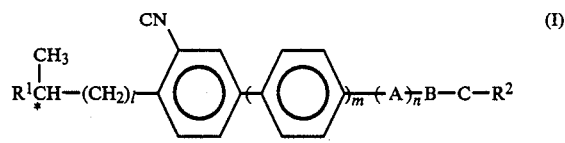

wherein $R^1$ represents an alkyl group of 2 to 18 carbon atoms; $R^2$ represents an alkyl group or alkoxy group each of 1 to 20 carbon atoms, hydrogen atom, a halogen atom or cyano group; A represents —COO— or —OCO—; B and C each represent a single bond,

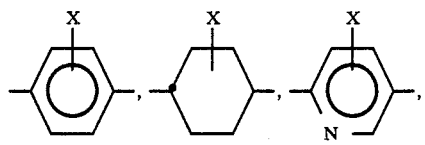

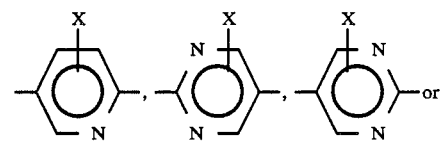

wherein X represents hydrogen atom, a halogen atom or cyano group; and l, m and n each represent 0 or 1, and a chiral liquid crystal composition containing at least one member of the same.

DETAILED DESCRIPTION OF PREFERRED EMBODIMENTS

The phase transition points and spontaneous polarization values Ps of representatives of the compound of the formula (I) of the present invention are shown in Table 1.

TABLE 1
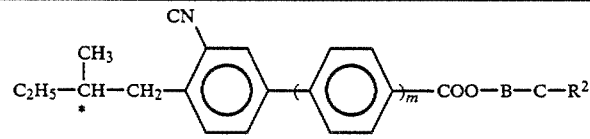
(Formula of compounds of Formula (I) wherein $R_1 = C_2H_5$, $l = 1$, $n = 1$ and $A = -COO-$)
| Sample No. | m | B | C | $R^2$ | Cr | $S_B$ | $S_{C^*}$ | SA | Ch | I | Ps (nC/cm$^2$) at °C. |
|---|---|---|---|---|---|---|---|---|---|---|---|
| 1 | 0 | ⬡ | Single bond | $C_8H_{17}$ | •22.2 | — | — | — | — | • | |
| 2 | 0 | ⬡ | ⬡ | $C_5H_{11}$ | •75.0 | — | — | •91.1 | •95.4 | • | $-28.5^{*1}$ (25° C.) |
| 3 | 0 | ⬡ | ⬡ | $C_7H_{15}$ | •44.4 | (•40.0) | — | •90.0 | •91.8 | • | $-30.0^{*1}$ (25° C.) |
| 4 | 0 | ⬡ | ⬡ | $C_8H_{17}$ | •33.0 | (•11.4) | •35.0 | •89.3 | — | • | $-15.9$ (25° C.) |
| 5 | 0 | ⬡ | ⬡ | $OC_4H_9$ | •128.3 | — | — | •130.0 | •136.7 | • | |
| 6 | 0 | ⬡ | ⬡ | $OC_5H_{11}$ | •101.8 | — | — | •121.6 | •129.0 | • | |
| 7 | 0 | ⬡ | ⬡ | $OC_7H_{15}$ | •56.8 | (•34.5) | •81.0 | •119.5 | •123.5 | • | $-34.5$ (51° C.) |
| 8 | 0 | ⬡ | ⬡ | $OC_8H_{17}$ | •47.5 | — | •85.0 | •121.3 | •123.6 | • | $-37.8$ (45° C.) |
| 9 | 0 | ⬡ | ⬡ | $OC_{10}H_{21}$ | •52.7 | — | •86.8 | •120.8 | — | • | $-41.5$ (46° C.) |
| 10 | 0 | ⬡ | ⬡ | $OC_{11}H_{23}$ | •67.2 | — | •87.5 | •119.2 | — | • | $-38.7$ (57.5° C.) |
| 11 | 0 | ⬡ | ⬡ | $OC_{12}H_{25}$ | •63.7 | — | •84.7 | •119.5 | — | • | $-34.9$ (54.7° C.) |
| 12 | 0 | ⬡ | ⬡(N) | $C_8H_{17}$ | •78.3 | — | (•59.0) | — | •84.3 | • | $-17.5$ (49° C.) |

TABLE 1-continued (Formula of compounds of Formula (I) wherein $R_1 = C_2H_5$, $l = 1$, $n = 1$ and $A = -COO-$)

$$CH_3$$
$$C_2H_5-\overset{*}{C}H-CH_2-\phantom{X}-\text{(ring)}-\text{(ring)}_m-COO-B-C-R^2$$
with CN substituent on first ring

| Sample No. | m | B | C | R² | Cr | S_B | S_C* | SA | Ch | I | Ps (nC/cm²) at °C. |
|---|---|---|---|---|---|---|---|---|---|---|---|
| 13 | 0 | cyclohexyl-F | pyridyl | C₈H₁₇ | •61.6 | — | — | — | (•56.0) | • | |
| 14 | 0 | phenyl | pyrimidyl (N,N) | C₈H₁₇ | •62.1 | — | — | (•56.8) | •69.7 | • | |
| 15 | 0 | phenyl | cyclohexyl-H | C₇H₁₅ | •72.1 | — | — | (•59.3) | •79.5 | • | |
| 16 | 0 | cyclohexyl-H | cyclohexyl-H | C₃H₇ | •90.5 | — | — | — | (•82.5) | • | |
| 17 | 1 | phenyl | Single bond | OC₈H₁₇ | •87.4 | — | — | •106.8 | •108.7 | • | −21.0*¹ (25° C.) |

¹By simple extrapolation from the Ps value of its mixture with achiral SC material as exemplifed in Examples 6 and 7.
²Sample numbers 4, 8 and 9 correspond to Examples 3, 1 and 2, respectively.

The first specific feature of the compounds expressed by the formula (I) consists in that its spontaneous polarization value is large. As to ferroelectric liquid crystals having a large spontaneous value, the response rate thereof, i.e., the rate at which molecules are inverted in an electric field, has been known to be higher than that of ferroelectric liquid crystals having a small spontaneous polarization value. Certain compounds of the formula (I) of the present invention have spontaneous polarization values exceeding about 40 nC/cm². Whereas, in the case of compounds corresponding to the compounds of the formula (I) but having no cyano group (i.e. having a hydrogen atom in place of the cyano group), for example, a compound (A)

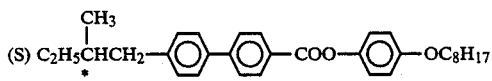

(S) $C_2H_5\overset{*}{C}HCH_2$—⟨⟩—⟨⟩—COO—⟨⟩—OC₈H₁₇ with CH₃ branch (a substance disclosed in Japanese patent application laid-open No. Sho 53-22883/1978) has about plus 1 nC/cm² as measured by the present inventors. Thus, the larger spontaneous polarization values of the compounds of the formula (I) of the present invention have come to be presumed to originate from the fact that cyano group is present at the ortho-position relative to the optically active group. Namely, it is considered that a substituent perpendicular to the major axis of the molecule and having a large permanent dipole moment, i.e. the cyano group, is present in a position close to the asymmetric carbon atom so that a large spontaneous polarization is induced by an interaction between them. On the other hand, it has been found that in the case of a compound having an asymmetric carbon atom apart from the dipole moment of its substituent or a compound having a substituent having a far smaller dipole moment than that of a cyano group, such as a fluorine atom, chlorine atom, bromine atom, etc., the spontaneous polarization values thereof do not become so large. Namely, it has been found by the research of the present inventors that for example, in the case of a compound having a fluorine atom in place of a cyano group in the formula (I) of the present invention, its spontaneous polarization value is almost nil.

It can be said that the large spontaneous polarization value originates from the following cores:

o-cyano-2-methylalkylphenyl or o-cyano-1-methylalkylphenyl, these groups corresponding to the case where l=0 or 1 in the formula (I),

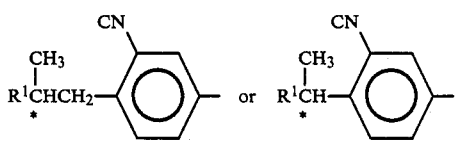

and any of liquid crystal compounds containing such cores are superior ferroelectric liquid crystal materials having a large spontaneous polarization value.

In particular, the compounds of l=1, i.e., the compounds having an o-cyano-2-methylalkylphenyl group, are easier to prepare than those of l=0; in this respect, the former compounds are practically more important than the latter. Further, compounds having an optically active group whose absolute configuration is in S-form are advantageous in view of the fact that the raw materials thereof are readily commercially available.

Comparison of the compounds of the formula (I) with the non-cyano-substituted compounds represented by the above formula (A) is interesting. When the two series of compounds both having an absolute configuration of S-form are compared, (i) the compounds of the formula (I) have a spontaneous polarization having a sign of minus and a large value, whereas the compounds of the formula (A) have a sign of plus and a small value;

(ii) the compounds of the formula (I) and those of the formula (A) both have a right-handed helical twist sense in smectic C phase; and (iii) the cholesteric phase induced when the compounds of the formula (I) and those of the formula (A) are added to nematic liquid crystals, respectively, both have a right-handed helical twist sense. The fact of the above paragraph (i) will be explained to be due to the fact that the cyano group at the ortho-position on the phenyl ring has a sign reverse to that of the spontaneous polarization based on 2-methylalkylphenyl group and also has a larger spontaneous polarization value than that of the latter. Further, the facts of the above paragraphs (ii) and (iii) will exhibit that the handedness of the helix is determined only by the absolute configuration of the optically active groups. Such specific features of the compounds of the formula (I) result in that the compounds are useful as a component of chiral smectic C liquid crystal compositions. Namely, when the S-form compounds of the formula (I) wherein l=1 are used together with other SC* compounds wherein the sign of the spontaneous polarization is minus, the former compounds can afford a large spontaneous polarization value without offsetting the spontaneous polarization value thereof, unlike the above A type compounds, and also since the handedness of the helix thereof is right-handed, the former compounds can make the helical pitch of left-handed SC* liquid crystal compositions longer.

In addition, the compounds of the formula (I) have an optically active carbon; hence when they are added to nematic liquid crystals, they have a capability of inducing a twisted structure (cholesteric phase) Nematic liquid crystals having a twisted structure, i.e. chiral nematic liquid crystals, do not form the so-called reverse domain of TN mode display elements; hence it is also possible to use the compounds as an agent for preventing the reverse domain from forming.

The compounds of the formula (I) of the present invention have specific features of a strong twisting power and a small temperature-dependency of the twisting power. Namely, as to the cholesteric pitch of the chiral nematic liquid crystals, for example when a compound of Sample No. 8 of Table 1 was added in 1% by weight to ZLI-1132 manufactured by Merck Company and the pitch of the resulting compositions was measured, the pitch was as short as 19 μm; hence they can be said to be very useful as a pitch-adjusting agent for chiral nematic liquid crystal compositions. Further, the temperature-dependency thereof was so small that the temperature specific feature δp expressed by the formula $$\delta p = \frac{2(P(t_1) - P(t_2))}{P(t_1) + P(t_2)} \times \frac{100}{t_1 - t_2}$$

was as very small as plus 0.212 (at $t_1=20°$ C. and $t_2=70°$ C.). This can be said to be a surprising specific feature as compared with the fact that, e.g. (S)-4-(2'-methylbutyl)-4'-cyanobiphenyl as a currently known pitch-adjusting agent for chiral nematic liquid crystal compositions, has a pδ of plus 0.584 as measured under the same conditions.

Next, preparation of the compounds of the formula (I) will be described.

A compound of the formula (I) wherein A=—COO— and n=1 may be suitably prepared through the following route:

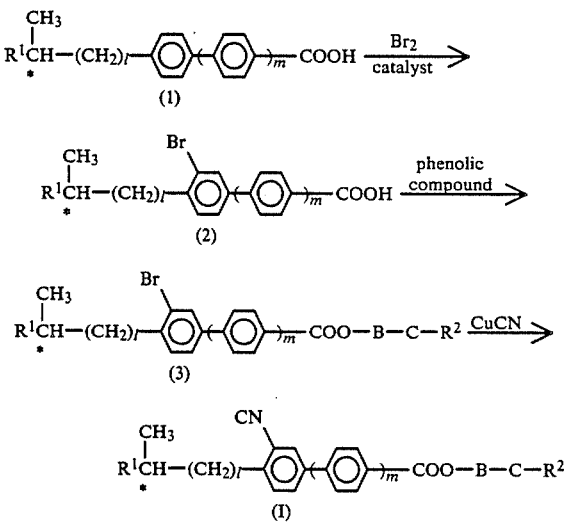

In the above equations, $R^1$, $R^2$, l, m, B and C are as defined above.

Namely, a 4-(1'-methylalkyl)benzoic acid, 4-(2'-methylalkyl)benzoic acid, 4-(1'-methylalkyl)biphenyl-4'-carboxylic acid or 4-(2'-methylalkyl)biphenyl-4'-carboxylic acid (1) is brominated in the presence of a catalyst to obtain a 3-bromo-4-(1'-methylalkyl)benzoic acid, 3-bromo-4-(2'-methylalkyl)benzoic acid, 3-bromo-4-(1'-methylalkyl)biphenyl-4'-carboxylic acid or 3-bromo-4-(2'-methylalkyl)biphenyl-4'-carboxylic acid (2), which is esterified by reacting a phenolic compound therewith to obtain a compound (3), which is reacted with a cyanogenating agent such as cuprous cyanide to obtain a compound of the formula (I).

Further, in the above steps, the order of the cyanogenation and esterification may also be reversed. Namely, the compound (2) may be cyanogenated to obtain a 3-cyano-4-(1'-methylalkyl)benzoic acid, 3-cyano-4-(2'-methylalkyl)benzoic acid, 3-cyano-4-(1'-methylalkyl)biphenyl-4'-carboxylic acid or 3-cyano-4-(2'-methylalkyl)biphenyl-4'-carboxylic acid, which is then esterified to obtain a compound of the formula (I).

Next, a compound of the formula (I) wherein A=—OCO— and n=1 may be suitably prepared through the following route:

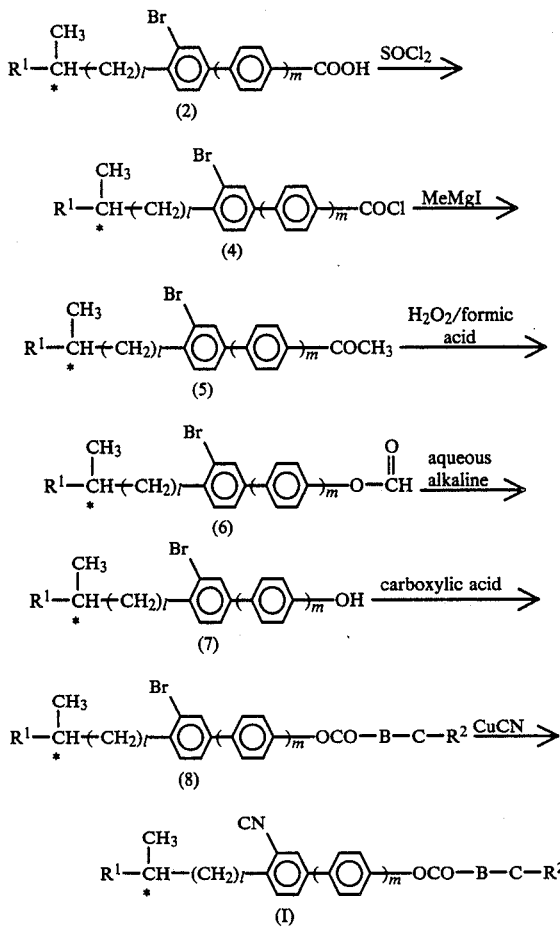

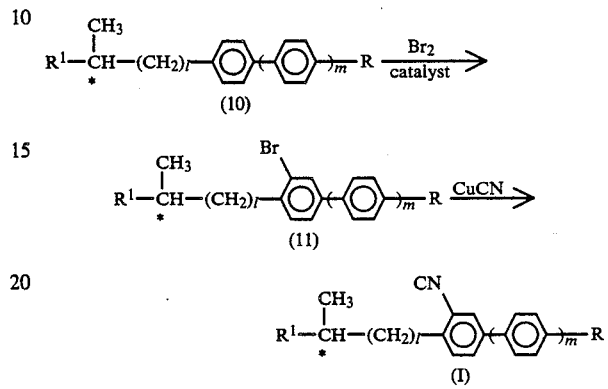

In the above equations, $R^1$, l and m are as defined above and R represents an alkyl group.

Namely, the compound (7) prepared above is reacted with an alkylating agent such as an alkyl bromide to obtain a compound (9), which is then reacted with a cyanogenating agent such as cuprous cyanide to obtain the compound of the formula (I).

Next, in the case of $R^2$=alkyl:

In the above equations, $R^1$, $R^2$, l, m, B and C are as defined above. Further, in the above steps, the order of the cyanogenation and esterification may also be reversed. Namely, the compound (7) may be cyanogenated to obtain a 3-cyano-4-(1'-methylalkyl)phenol, 3-cyano-4-(2'-methylalkyl)phenol, 3-cyano-4-(1'-methylalkyl)-4'-hydroxybiphenyl or 3-cyano-4-(2'-methylalkyl)-4'-hydroxybiphenyl, which is then esterified to obtain the compound of the formula (I).

Further, a compound of the formula (I) wherein n=0 and B and C each represent a single bond may be suitably prepared through the following route:

First, in the case of $R^2$=alkoxy:

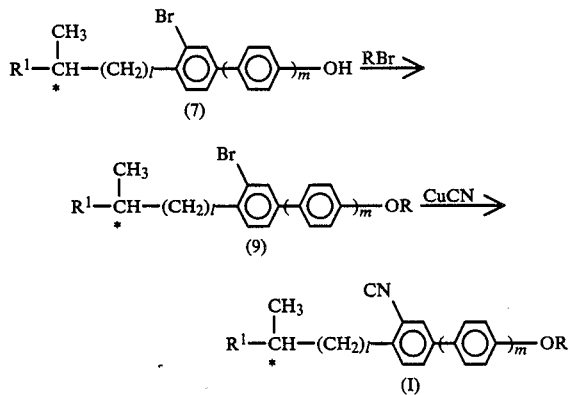

In the above equations, $R^1$, l and m are as defined above and R represents an alkyl group.

Namely, a 4-(1'-methylalkyl)-alkylbenzene, 4-(2'-methylalkyl)-alkylbenzene, 4-(1'-methylalkyl)-4'-alkylbiphenyl or 4-(2'-methylalkyl)-4'-alkylbiphenyl (10) is brominated in the presence of a catalyst to obtain a compound (11), which is then reacted with a cyanogenating agent such as cuprous cyanide to obtain the compound of the formula (I).

The optically active liquid crystal compound of the present invention will be described in more detail by way of Examples.

EXAMPLE 1

Preparation of (S)-3-cyano-4-(2'-methylbutyl)benzoic acid 4-octyloxy-4'-biphenylyl ester (a compound of the formula (I) wherein m=0; n=1; A=—COO—; $R^1$=$C_2H_5$—; $R^2$=—$OC_8H_{17}$; and $B = C = $ 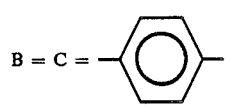 (compound No. 8))

A solution of silver nitrate (177 g, 1.1 mol) in water (500 ml) was dropwise added to a solution in water (500 ml), of a mixture of (S)-4-(2'-methylbutyl)benzoic acid (200 g, 1.0 mol), nitric acid (680 ml) and bromine (183 g, 1.1 mol), under ice-cooling, followed by agitating the mixture at room temperature for 5 hours, feeding it into ice water, filtering deposited crystals, adding a 10% sodium carbonate aqueous solution (2 l), sufficiently agitating the mixture, filtering off a remaining insoluble substance, acidifying the filtrate with sulfuric acid, filtering deposited crystals and recrystallizing from acetic acid (1 l) to obtain 3-bromo-4-(2'-methylbutyl)benzoic acid (106.0 g, m.p. 78.8°–79.7° C.).

Thionyl chloride (118 g) was added to the 3-bromo-4-(2'-methylbutyl)benzoic acid (100 g, 0.37 mol) followed by refluxing the mixture for 2 hours and distilling off excess thionyl chloride under reduced pressure to obtain 3-bromo-4-(2'-methylbutyl)benzoic acid chloride (105.1 g).

This 3-bromo-4-(2'-methylbutyl)benzoic acid chloride (11.5 g, 0.04 mol) was dropwise added to a mixture of 4-hydroxy-4'-octyloxybiphenyl with anhydrous pyridine under ice cooling, followed by agitating the resulting mixture at 50°–60° C. for 2 hours, adding toluene (100 ml), sufficiently agitating the mixture, washing it with 6N-HCl, then with 2N-NaOH aqueous solution and further with water, further drying over anhydrous MgSO₄, distilling off toluene and recrystallizing the residue from a mixture of ethanol (100 ml) with ethyl acetate (60 ml) to obtain 3-bromo-4-(2'-methylbutyl)-benzoic acid 4'-octyloxy-4-biphenylyl ester (12.2 g), which exhibited liquid crystalline properties and had the following phase transistion points:

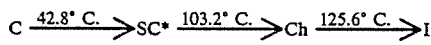

A mixture of this 3-bromo-4-(2'-methylbutyl)benzoic acid 4-octyloxy-4'-biphenylyl ester (5.5 g, 0.01 mol), cuprous cyanide (1.1 g, 0.06 mol) and dimethylformamide (20 ml) was heated to 145°–147° C., following by agitating it for 6 hours, adding a mixture of ferric chloride (4 g), hydrochloric acid (1 ml) and water (7 ml), keeping the mixture at 60°–70° C. for 15 minutes, feeding it into ice water, adding toluene, sufficiently agitating the mixture, transferring it into a separating funnel, several times washing the resulting organic layer with water, drying it over anhydrous MgSO₄, distilling off toluene and recrystallizing the residue from ethanol (50 ml) to obtain the objective 3-cyano-4-(2'-methylbutyl)-benzoic acid 4'-octyloxy-4-biphenylyl ester (1.7 g). The phase transition points of this product were as follows:

EXAMPLE 2

Preparation of (S)-3-cyano-4-(2'-methylbutyl)benzoic acid 4'-decyloxy-4-biphenylyl ester (a compound of the formula (I) wherein m=0; n=1; A=—COO—; $R^1=C_2H_5$; $R^2=$—OC₁₀H₂₁; and

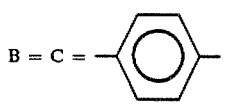

(compound 9))

Example 1 was repeated except that 4-hydroxy-4'-octyloxybiphenyl was replaced by 4-hydroxy-4'-decyloxybiphenyl, to obtain (S)-3-cyano-4-(2'-methylbutyl)benzoic acid 4'-decyloxy-4-biphenylyl ester. The phase transition points of this product were as follows:

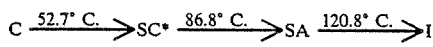

EXAMPLE 3

Preparation of (S)-3-cyano-4-(2'-methylbutyl)benzoic acid 4-octyl-4'-biphenylyl ester (a compound of the formula (I) wherein m=0; n=1, A=—COO—; $R^1=C_2H_5$—; $R^2=$—C₈H₁₇; and

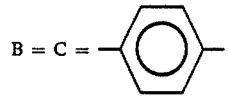

(compound 4))

Example 1 was repeated except that 4-hydroxy-4'-octyloxybiphenyl was replaced by 4-hydroxy-4'-octylbiphenyl to obtain (S)-3-cyano-4'-(2'-methyloctyl)benzoic acid 4'-octyl-4-biphenylyl ester. The phase transition points of this product were as follows:

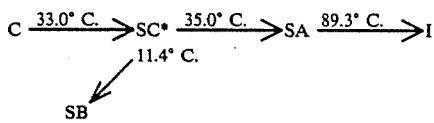

Further, as previously described, in the case where the order of the cyanogenation and esterification steps may be reversed, Examples 1 to 3 are changed as follows: 3-bromo-4-(2'-methylbutyl)benzoic acid is first cyanogenated to obtain 3-cyano-4-(2'-methylbutyl)benzoic acid (m.p. 91.2°–92.1° C.), which is then esterified. The physical properties of the resulting product were the same as those in the cases of Examples 1 to 3.

EXAMPLE 4

Preparation of (S)-3-cyano-4-(2'-methylbutyl)biphenyl-4'-carboxylic acid 4-octyloxyphenyl ester (a compound of the formula (I) wherein m=1; n=1; A=—COO—; $R^1=C_2H_5$—; $R^2=$—OC₈H₁₇;

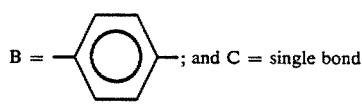

(compound No. 17))

Example was repeated except that (S)-4-(2'-methylbutyl)benzoic acid was replaced by (S)-4-(2'-methylbutyl)biphenyl-4'-carboxylic acid to obtain (S)-3-cyano-4-(2'-methylbutyl)biphenyl-4'-carboxylic acid 4-octyloxyphenyl ester. The phase transition points of this product were as follows:

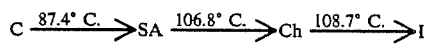

EXAMPLE 5 (USE EXAMPLE 1)

A liquid crystal mixture consisting of the following proportions of achiral smectic liquid crystal compounds was prepared:

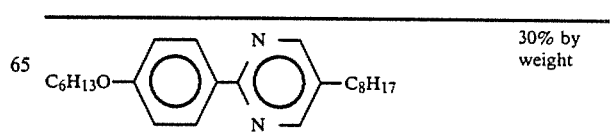

30% by weight

| Structure | Weight % |
|---|---|
| $C_8H_{17}O-\text{Ph}-\text{Pyrimidine}-C_8H_{17}$ | 20% by weight |
| $C_9H_{17}O-\text{Ph}-\text{Pyrimidine}-C_8H_{17}$ | 10% by weight |
| $C_{14}H_{21}O-\text{Ph}-\text{Pyrimidine}-C_8H_{17}$ | 10% by weight |
| $C_5H_{11}-\text{Ph}-\text{Ph}-\text{Pyrimidine}-C_8H_{17}$ | 20% by weight |
| $C_7H_{15}-\text{Ph}-\text{Ph}-\text{Pyrimidine}-C_8H_{17}$ | 10% by weight |

The above mixture has a m.p. of 4° C. and exhibits SC phase at higher temperature than the above, SA phase at 65° C., N phase at 79° C. and isotropic liquid at 90° C.

To this liquid crystal mixture (80% by weight) was added compound No. 8 in Table 1 (20% by weight) to prepare a chiral smectic liquid crystal composition.

This liquid crystal composition was filled in a cell of 2 μm thick provided with transparent electrodes each obtained by coating the surface with PVA (polyvinyl alcohol) and rubbing the resulting surface to subject it to parallel aligning treatment, followed by placing the resulting liquid crystal element between a polarizer and an analyzer crossed to each other and impressing a voltage of 15 V. As a result, change in the intensity of transmitted light was observed. The response time was sought from the change in the intensity of transmitted light at that time to give about 125 μsec at 25° C.

The above composition had a m.p. of 0° C. and exhibited SC* phase at higher temperatures than the above, SA phase at 69.2° C., cholesteric phase (Ch phase) at 84.5° C. and isotropic liquid at 92.6° C. The twist senses in the SC* phase and Ch phase were both right-handed.

In addition, its spontaneous polarization value was minus 3 nC/cm² at 25° C. and its tilt angle was 19°.

As described above, it is seen that when a compound of the formula (I) of the present invention is mixed with non-optically active liquid crystal compounds, a superior ferroelectric chiral smectic liquid crystal composition is obtained.

EXAMPLE 6 (USE EXAMPLE 2)

To the same achiral liquid crystal composition as in Example 5 (80% by weight) was added compound No. 17 as a compound of the present invention (20% by weight). The resulting liquid crystal composition exhibited the following transition points:

C-SC* 3° C.; SC*-SA 70.0° C.; SA-Ch 80.0° C. and Ch-I 90.6° C.

This composition also exhibited a spontaneous polarization value of minus 4.2 nC/cm², a tilt angle of 25° and a right-handed SC* twist sense, and the response time was 120 μsec under the same conditions as in Example 5.

It was impossible to directly observe the SC* phase of Compound No. 17 by itself since it crystallized before it was cooled down to a temperature at which SC* phase was exhibited, but as shown in this Example, by mixing with a SC liquid crystal composition, it can be used for constituting a ferroelectric liquid crystal composition. This fact applies to other compounds shown in Table 1 which are not observed to exhibit SC* phase by themselves.

EXAMPLE 7 (USE EXAMPLE 3)

To the achiral smectic liquid crystal composition described in Example 5 (80% by weight) was added a compound of Sample No. 3 (in Table 1) (20% by weight) to prepare a chiral smectic composition. This composition exhibited the following phase transition points:

C-SC* −11° C.; SC*-SA 62.1° C.; SA-Ch 77.5° C.; and Ch-I 86.1° C.

Its Ps at 25° C. was minus 6.0 nC/cm² and its tilt angle was 18°.

This liquid crystal composition was made up into a liquid crystal cell as described in Example 5 and the response time was measured under the same conditions but at an impressed voltage of 20 V to give 90 μsec.

EXAMPLE 8 (USE EXAMPLE 4)

A nematic liquid crystal composition consisting of

| Structure | % |
|---|---|
| $C_2H_5-\text{Ph}-\text{Ph}-CN$ | 20% |
| $C_5H_{11}-\text{Ph}-\text{Ph}-CN$ | 40% |
| $C_8H_{17}O-\text{Ph}-\text{Ph}-CN$ | 25% |
| $C_5H_{11}-\text{Ph}-\text{Ph}-\text{Ph}-CN$ | 15% | was filled in a cell having a distance of 10 μm between electrodes to prepare a TN mode display cell, which was then observed under a polarizing microscope. As a result, a reverse domain was observed to be formed. In addition, the cell used was obtained by coating the surface with polyvinyl alcohol and rubbing the resulting surface to subject it to parallel aligning treatment.

To the above nematic liquid crystal composition was added compound No. 8 in Table 1 in an amount of 0.1% by weight, and a TN mode cell the same as the above was prepared. As a result of observing the cell, the reverse domain was dissolved and a uniform nematic phase was observed.

What we claim is:

1. An optically active liquid crystal compound expressed by the formula

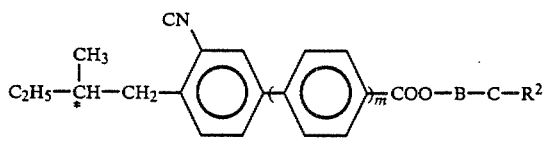

wherein R² represents an alkyl group or alkoxy group each of 1 to 20 carbon atoms, B represents

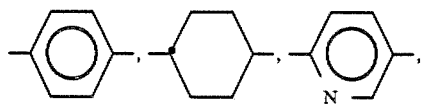

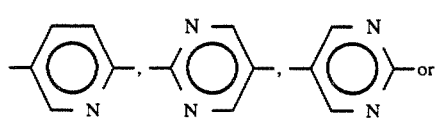

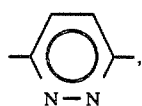

C represents B or a single bond, and m represents 0 or 1.

2. An optically active liquid crystal compound according to claim 1, wherein m represents 0.

3. An optically active liquid crystal compound according to claim 2, wherein each of B and C represents

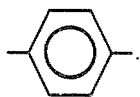

4. An optically active liquid crystal compound according to claim 3, wherein R² represents an alkoxy group of 1 to 20 carbon atoms.

5. An optically active liquid crystal compound according to claim 2, wherein B—C represents

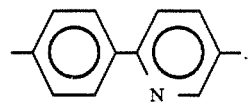

6. An optically active liquid crystal compound according to claim 2, wherein B—C represents

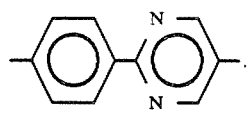

7. An optically active liquid crystal compound according to claim 2, wherein B—C represents

8. An optically active liquid crystal compound according to claim 2, wherein B—C represents

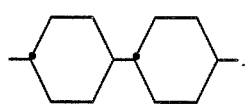

9. An optically active liquid crystal compound according to claim 1, wherein m represents 1.

10. An optically active liquid crystal compound according to claim 9, wherein B represents

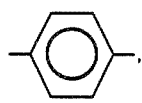

and C represents a single bond.

11. A liquid crystal composition comprising at least two components at least one of which is an optically active liquid crystal compound as set forth in claim 1.

12. A liquid crystal composition according to claim 11, exhibiting a chiral smectic C phase.

13. A liquid crystal composition according to claim 11, exhibiting a chiral nematic phase.

* * * * *